United States Patent
Walter

(10) Patent No.: US 10,843,547 B2
(45) Date of Patent: Nov. 24, 2020

(54) DRIVE TRAIN FOR A HYBRID MOTOR VEHICLE

(71) Applicant: Schaeffler Technologies AG & Co. KG, Herzogenaurach (DE)

(72) Inventor: Bernhard Walter, Oberkirch-Haslach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 241 days.

(21) Appl. No.: 16/090,673

(22) PCT Filed: Mar. 14, 2017

(86) PCT No.: PCT/DE2017/100206
§ 371 (c)(1),
(2) Date: Oct. 2, 2018

(87) PCT Pub. No.: WO2017/178002
PCT Pub. Date: Oct. 19, 2017

(65) Prior Publication Data
US 2020/0324638 A1 Oct. 15, 2020

(30) Foreign Application Priority Data
Apr. 14, 2016 (DE) .................. 10 2016 206 278

(51) Int. Cl.
*B60K 6/36* (2007.10)
*B60K 6/24* (2007.10)
(Continued)

(52) U.S. Cl.
CPC .................. *B60K 6/36* (2013.01); *B60K 6/24* (2013.01); *B60K 6/26* (2013.01); *B60K 6/38* (2013.01);
(Continued)

(58) Field of Classification Search
None
See application file for complete search history.

(56) References Cited

U.S. PATENT DOCUMENTS

| 8,485,290 B2 * | 7/2013 | Abe .......................... B60K 6/48 180/65.21 |
| 10,549,623 B1 * | 2/2020 | Park ....................... F16H 37/065 |
| 2008/0236917 A1 | 10/2008 | Abe et al. |

FOREIGN PATENT DOCUMENTS

| DE | 102012218282 A1 | 9/2013 |
| DE | 102012016988 A1 | 5/2014 |

(Continued)

*Primary Examiner* — Dirk Wright
(74) *Attorney, Agent, or Firm* — Kevin L. Parks

(57) ABSTRACT

A drive train for a hybrid motor vehicle is disclosed. The drive train includes a drive shaft for introducing a torque produced in an internal combustion engine, a transmission input shaft, which can be coupled to the drive shaft by a first clutch, and a steplessly adjustable variator coupled to the transmission input shaft for converting and transmitting the torque to an output shaft. The drive train also includes an electric machine for introducing an electrically produced torque, wherein the electric machine has a rotor, which can be made to interact with a stator, and the rotor can be coupled to the transmission input shaft by a second clutch. A direct drive stage is provided, which can be coupled to the rotor of the electric machine by a third clutch, for transmitting the torque produced in the electric machine past the variator to the output shaft. The first clutch, the second clutch and the third clutch are arranged radially on the inside in relation to the rotor.

9 Claims, 4 Drawing Sheets

(51) Int. Cl.
*B60K 6/543* (2007.10)
*B60K 6/26* (2007.10)
*B60K 17/16* (2006.01)
*F16H 9/16* (2006.01)
*F16H 37/08* (2006.01)
*B60K 6/38* (2007.10)

(52) U.S. Cl.
CPC .............. *B60K 6/543* (2013.01); *B60K 17/16* (2013.01); *F16H 9/16* (2013.01); *F16H 37/0806* (2013.01); *B60Y 2200/92* (2013.01)

(56) References Cited

FOREIGN PATENT DOCUMENTS

| | | | |
|---|---|---|---|
| DE | 102013220223 A1 | 9/2014 | |
| EP | 2199136 A1 * | 6/2010 | ............... B60K 6/48 |
| EP | 2383140 A1 | 11/2011 | |
| JP | 2012056366 A | 3/2012 | |
| WO | 2015110108 A1 | 7/2015 | |

* cited by examiner

DRIVE TRAIN FOR A HYBRID MOTOR VEHICLE

CROSS-REFERENCE TO RELATED APPLICATIONS

This application is the U.S. National Phase of PCT Appln. No. PCT/DE2017/100206 filed Mar. 14, 2017, which claims priority to DE 10 2016 206 278.6 filed Apr. 14, 2016, the entire disclosures of which are incorporated by reference herein.

TECHNICAL FIELD

The present disclosure relates to a drive train, with the aid of which a hybrid motor vehicle can be driven.

BACKGROUND

WO 2015/110 108 A1 discloses a drive train for a hybrid motor vehicle, in which a crankshaft of an internal combustion engine can be coupled by means of a first clutch to a transmission input shaft, to which a rotor of an electric machine can also be coupled by means of a second clutch. Adjacent to the electric machine in the axial direction, a steplessly adjustable CVT is connected to the transmission input shaft via a gearwheel stage in order to convert the torque of the transmission input shaft and transmit it to a differential. Also provided adjacent to the electric machine in the axial direction is a third clutch, by means of which a direct drive stage can be coupled to the transmission input shaft in order to transmit the torque without conversion past the CVT to the differential.

There is a constant need to adapt a drive train to restricted installation spaces.

SUMMARY

It is the object of the present disclosure to indicate measures that make a drive train suitable for restricted installation spaces possible.

According to the present disclosure, a drive train for a hybrid motor vehicle is provided, having a drive shaft for introducing a torque, in particular a torque produced in an internal combustion engine, a transmission input shaft, which can be coupled to the drive shaft by means of a first clutch, a steplessly adjustable variator coupled to the transmission input shaft for converting and transmitting a torque to an output shaft, an electric machine for introducing an electrically produced torque, wherein the electric machine has a rotor, which can be made to interact with a stator, and the rotor can be coupled to the transmission input shaft by means of a second clutch, and a direct drive stage, which can be coupled to the rotor of the electric machine by means of a third clutch, for transmitting the torque produced in the electric machine past the variator to the output shaft, wherein the first clutch, the second clutch and the third clutch are arranged radially on the inside in relation to the rotor.

In the motor mode, the electric machine can introduce electric energy as electrically produced torque into the drive train to enable the motor vehicle to be driven, in particular in a purely electric manner. In the generator mode, the electric machine can furthermore derive a torque from the drive train and can produce electric energy, which can be stored, in particular in a motor vehicle battery, preferably a traction battery for the purely electric driving of the motor vehicle, and can be withdrawn again at a later time. The electric machine can have, in particular, a stator made up of electromagnets, which can interact with a rotor preferably made up of permanent magnets in order to exchange power. In principle, a high power of the electric machine is desirable in electrically drivable motor vehicles. The high electric power can be achieved if the rotor and the stator have a diameter which is as large as possible and an axial extent which is as large as possible since this enables a particularly large number of interacting permanent magnets and/or electromagnets to be provided. However, the dimensions of the electric machine are severely limited by the installation space that can be made available in the motor vehicle.

In the present disclosure, use is made of the insight that the installation space formed radially within the electric machine, especially in an electrically drivable motor vehicle, may be large enough to provide the first clutch, the second clutch and the third clutch in this installation space. It is thereby possible to save installation space in the axial direction adjacent to the electric machine, in which space the third clutch, for example, would otherwise be arranged. This makes it possible to increase the axial extent of the electric machine and hence the power thereof and/or to reduce the axial extent of the drive train. The first clutch, the second clutch and the third clutch can be provided one behind the other in the axial direction. In particular, the first clutch, the second clutch and the third clutch are provided in a common radius region, and therefore these clutches can at least partially overlap, when viewed in the radial direction. As a result, it is not necessary to couple the first clutch, the second clutch and/or the third clutch to the transmission input shaft via a gearwheel stage with a radial offset relative to the transmission input shaft. It is thereby possible to save radial installation space. By means of the clutches provided radially on the inside in relation to the electric machine, it is possible to save installation space in the axial and/or the radial direction, thus making a drive train that is suitable for restricted installation spaces possible.

The drive shaft can be designed as a crankshaft and can be part of an internal combustion engine, for example. The drive shaft preferably has a torsional vibration damper, e.g. a dual-mass flywheel, allowing the drive shaft to interact with the first clutch by means of a hub provided on the output side relative to the torsional vibration damper. The first clutch is designed as a friction clutch, in particular a multiplate clutch, for example. As a separating clutch, the first clutch can decouple the drive shaft from the transmission input shaft and/or couple it to the transmission input shaft. The variator can be permanently coupled to the transmission input shaft. For this purpose, the transmission input shaft can simultaneously be designed as a variator drive shaft for introducing the torque into the variator and can project into the variator. The transmission input shaft can also be connected to a separate, coaxially arranged variator drive shaft by way of a connection for conjoint rotation, e.g. a connection designed as a plug-and-socket connection. It is furthermore possible for the variator to be coupled to the transmission input shaft with a radial offset relative to the transmission input shaft, e.g. by means of a gearwheel stage. In particular, the variator is designed as a CVT (continuously variable transmission). By way of example, the variator has cone pulley pairs coupled to one another by a traction means, wherein the spacing between the cone pulleys of the respective cone pulley pair is variable in order to vary the transmission ratio in a stepless manner. With the aid of the direct drive stage, the power flow can be directed past the variator. This is recommended, for example, in the case of purely electric operation, when the speed and torque of the electric machine can be set by means of a suitable control system during the power input of the electric machine. In this case, there is no need for conversion of the speed and torque with the aid of the variator, thus enabling friction-related power losses in the variator to be avoided. The direct drive stage can couple the transmission input shaft to a differential when the third clutch is closed, e.g. via an interposed gearwheel stage and/or an interposed intermediate shaft. The differential has at least one output shaft which leads to a driven wheel of the motor vehicle in order to move the motor vehicle over an underlying surface. For reversing the motor vehicle, it is preferable to provide only the electric machine, which can rotate easily in different directions. It is possible to eliminate a mechanical reversal of the direction of rotation in the drive train, thereby enabling the installation space required for this purpose to be saved. In particular, the transmission input shaft extends coaxially with the electric machine. The transmission input shaft can be coupled to a pump, with the aid of which a hydraulic pressure can be built up, in particular for operating the variator and/or for operating the first, the second and/or the third clutch. The transmission input shaft preferably has a delivery channel through which hydraulic oil or some other medium can be delivered to the respective hydraulic load.

In particular, the first clutch, the second clutch and the third clutch are at least partially, preferably completely, overlapped by the rotor in the open and/or in the closed state, when viewed in the radial direction. The first clutch, the second clutch and the third clutch can be inserted into the electric machine. The electric machine, the first clutch, the second clutch and the third clutch can be arranged in a common axial installation space region, thus enabling the axial extent of the drive train to be minimized. For example, the drive shaft and/or a hub coupled to the drive shaft can enter the electric machine, thus enabling the first clutch to be provided completely within the electric machine.

The second clutch and/or the third clutch are preferably designed as wedge clutches, in particular hydraulically actuable wedge clutches. As a first transmission element, the wedge clutch can have a wedge disk having a plurality of wedge-shaped ramps which are distributed on a common radius in the circumferential direction and face in the axial or the radial direction and which can be coupled to a rotor disk as a second transmission element via a selector disk. The selector disk has wedge-shaped counter ramps which correspond to the wedge-shaped ramps and which form a ramp system with the ramps. Depending on the rotation of the selector disk relative to the wedge disk, the extent of the ramp system can increase, thus enabling the selector disk to be moved axially relative to the wedge disk. The selector disk can thereby be wedged by frictional engagement on the rotor disk and/or can be coupled by positive engagement to the rotor disk, which is designed as a ring for example, in particular by way of splines, thereby enabling the wedge clutch to be closed and a torque to be transmitted. When the rotor disk is subject to relative rotation in the opposite direction of relative rotation, the extent of the ramp system can be reduced, thereby enabling the wedge clutch to be opened and torque transmission to be interrupted. In principle, the wedge clutch can be designed in a manner similar to a single-acting freewheel without interposed rolling elements. A suitable wedge clutch is known in the form of a "Schaeffler Wedge Clutch". In particular, the wedge clutch can be designed and developed in the manner described in DE 10 2012 218 282 A1 and/or DE 10 2013 220 223 A1, the contents of which are hereby incorporated by reference. The wedge clutch has a particularly small axial extent, enabling the second clutch and/or the third clutch to be inserted easily into the electric machine radially on the inside in relation to the rotor of the electric machine. The second clutch and/or the third clutch is/are preferably hydraulically actuable, and it is therefore not necessary to provide electric leads and an electromagnet to actuate the second clutch and/or the third clutch. Instead, a hydraulic pressure built up for the operation of the variator, in particular for the hydraulic variation of the transmission ratio, can be used to hydraulically actuate the second clutch and/or the third clutch.

As a particular preference, the rotor has a transmission disk, which projects radially inward from the rotor, for introducing the torque produced in the electric machine, wherein the transmission disk has a second transmission element, in particular a transmission element designed as a wedge disk, for transmitting the torque in the second clutch designed as a wedge clutch, and/or has a third transmission element, in particular a transmission element designed as a wedge disk, for transmitting the torque in the third clutch designed as a wedge clutch, wherein, in particular, the first wedge disk and the second wedge disk are provided on different axial sides of the transmission disk. In particular, the rotor can be supported and mounted radially and/or axially on the transmission input shaft via the transmission disk, thereby making it possible to avoid tilting of the rotor. Here, the transmission disk provided for this purpose can form part of the second clutch and/or of the third clutch or can be fastened for conjoint rotation to a part of the second clutch and/or of the third clutch. For example, a transmission element of the second clutch and/or of the third clutch can be riveted and/or welded to the transmission disk. In particular, the transmission element both of the second clutch and of the third clutch is fastened to the transmission disk, resulting in a substantially symmetrical construction. It is possible, in particular, for the transmission elements fastened to the transmission disk to be of identical or mirror-image design.

In another embodiment, the transmission disk, which is coupled to the rotor for conjoint rotation via splines for example, can be embodied in such a way as to be movable in the axial direction, and therefore all that is required to close the second clutch or the third clutch is to move the transmission disk axially. The remaining part of the second clutch and of the third clutch is fixed in terms of motion, in particular in the axial direction. It is thereby possible to ensure that either only the second clutch or only the third clutch can transmit the torque of the electric machine either to the variator or past the variator. Conflict between the direct drive stage and the variator is thereby excluded. In a central position of the transmission disk, both the second clutch and the third clutch can be open, with the result that, depending on the shift state of the first clutch, the drag torque of the motor vehicle transmission can be shed for example, or purely mechanical driving with the aid of the internal combustion engine is made possible.

In particular, a motor housing covering the electric machine is provided, wherein the motor housing has an oil supply channel for supplying the third clutch with hydraulic oil, wherein, in particular, the hydraulic oil is passed via an axially movable actuating element of the third clutch. The third clutch can be provided at the edge of the electric machine in the axial direction, thus enabling the third clutch to be provided particularly close to the motor housing covering the electric machine. In particular, the third clutch has a hydraulically actuable actuating element, which is guided in an annular actuating cylinder, for example. The actuating element can be moved axially by the hydraulic pressure built up in the actuating cylinder. In particular, the actuating element can have an oil channel, which can communicate with the oil supply channel of the motor housing in any axial relative position. At the same time, the oil channel of the actuating element can communicate with an interior space of the actuating cylinder, thus enabling the axially movable actuating element to transfer the hydraulic oil from the fixed oil supply channel of the motor housing to the interior space of the actuating cylinder. For this purpose, the oil channel of the actuating element can be open radially toward the outside via an axial distance corresponding to the axial movement path of the actuating element, for example, thus enabling the oil supply channel of the motor housing to communicate with the oil channel of the actuating element irrespective of the axial relative position of the actuating element. As a result, the fixed oil supply channel of the motor housing can communicate easily with the rotating annular actuating cylinder via the axially movable actuating element in order to be able to transfer the hydraulic oil to the third clutch and to actuate the third clutch.

The variator preferably has an input-side driving cone pulley pair and a driven cone pulley pair, which is coupled to the driving cone pulley pair by means of a traction means, wherein the driving cone pulley pair has an adjustable input pulley, which can be moved axially to a limited extent with the aid of an input-side axial retaining element, and the driven cone pulley pair has an adjustable output pulley, which can be moved axially to a limited extent with the aid of an output-side axial retaining element, wherein an input bearing for the input-side support of the variator at least partially overlaps the input-side axial retaining element, when viewed in the radial direction, and/or an output bearing for the output-side support of the variator at least partially overlaps the output-side axial retaining element, when viewed in the radial direction. The respective axial retaining element can limit the maximum permissible spacing between the cone pulleys of the respective cone pulley pair. For this purpose, the axial retaining element can be designed as a retaining ring inserted into a groove, for example. The respective bearing can be arranged radially on the outside in relation to the axial retaining element, thus making it possible to save axial installation space. The axial retaining element is preferably completely overlapped by the associated bearing in the radial direction. An inner ring of the respective bearing can have a recess introduced into the inner ring partially in the axial direction, into which the associated axial retaining element can be inserted. The remainder of the inner ring can rest against a variator drive shaft coupled to the driving cone pulley pair or against a variator output shaft coupled to the driven cone pulley pair and, in particular, can be pressed on. The respective bearing can be secured axially with part of the inner ring between the associated axial retaining element and the associated axially movable adjustable pulley.

In particular, the cone pulleys of the variator have a cone angle of 7° to 11°, preferably 9°±0.5°. The driven cone pulley pair and/or the driving cone pulley pair is/are preferably not fitted with a centrifugal oil hood, thus making it possible to save additional installation space. In particular, only the driving cone pulley pair or only the driven cone pulley pair is fitted with a centrifugal oil hood for retaining hydraulic oil flung off due to centrifugal force, whereas the other cone pulley pair is preferably fitted only with a return spring and no hydraulic actuation. The spring force of the return spring can move the associated cone pulley pair into a defined initial position corresponding to the position of the cone pulleys in which they are as close as possible or as far apart as possible, whereas the pressure that can be built up hydraulically in the other cone pulley pair can move the cone pulleys out of the initial position.

As a particular preference, a variator housing, which covers the variator, is provided, wherein the variator housing and/or a motor housing covering the electric machine at least partially overlaps the direct drive stage, wherein the direct drive stage is fastened to the variator housing. The direct drive stage can have a gearwheel mounted on a shaft to form a gearwheel stage, for example, wherein the shaft is fastened to the variator housing, e.g. by screw fastening. This makes it possible to preassemble the direct drive stage to the variator and to fasten the modular unit having the electric machine as a whole to the variator. In this process, the transmission input shaft can be preassembled to the variator, for example, and the first clutch, the second clutch and the third clutch can be mounted on the transmission input shaft during assembly, in particular to form a plug-and-socket connection, e.g. splines.

In particular, the variator has an input-side variator drive shaft coupled to the transmission input shaft, wherein the variator drive shaft is arranged substantially coaxially with the transmission input shaft, and the first clutch and/or the second clutch are/is coupled for conjoint rotation to the variator drive shaft on the output side, in particular by means of a plug-and-socket connection, or wherein the variator drive shaft is arranged laterally offset with respect to the transmission input shaft by means of an intermediate gearwheel pair. In the case of coaxial arrangement of the variator drive shaft with the transmission input shaft, it is possible, in particular, for the variator drive shaft and the transmission input shaft to be of integral design. The number of components can thereby be reduced. In the case of the laterally offset arrangement of the variator drive shaft with respect to the transmission input shaft, relatively short shafts, which cannot be so easily tilted and/or bent, can be used for the variator drive shaft and the transmission input shaft.

The direct drive stage preferably has an intermediate wheel, which meshes with the third clutch, wherein the intermediate wheel meshes with a variator output wheel mounted on an output-side variator output shaft, wherein the variator output wheel is coupled to the output shaft, in particular by means of a differential. It is thereby possible to avoid an intermediate shaft for the direct drive stage, thus making possible a particularly space-saving construction for the drive train. In particular, it is possible to save radial installation space. Instead, the variator output wheel can be used in the direct drive stage to bridge the distance between the transmission input shaft and the differential or the output shaft. In particular, it is envisaged that the variator output wheel can be coupled to the variator output shaft of the variator for conjoint rotation by means of a variator clutch. When the power of the drive train is supposed to flow via the variator, the third clutch can be opened and the variator clutch closed. When the power of the drive train is supposed to flow past the variator via the direct drive stage, the third clutch can be closed and the variator clutch opened.

As a particular preference, the direct drive stage has an intermediate shaft, which meshes with the third clutch, wherein the intermediate shaft is coupled to the output shaft, in particular by means of a differential. By means of the intermediate shaft, it is possible to minimize interposed gearwheel pairs in the case of a power flow via the direct drive stage. Unnecessary power losses, due to friction between the gearwheel pairs for example, can thereby be avoided. It is preferable if only precisely two gearwheel pairs are provided between the transmission input shaft and the differential in the direct drive stage, it being possible for both of said pairs to be formed by meshing with the intermediate shaft.

BRIEF DESCRIPTION OF THE DRAWINGS

The present disclosure is explained below by way of example by means of preferred illustrative embodiments with reference to the attached drawings, wherein the features presented below can each form an aspect of the present disclosure both individually and in combination. In the drawings.

DETAILED DESCRIPTION

Figure 1:
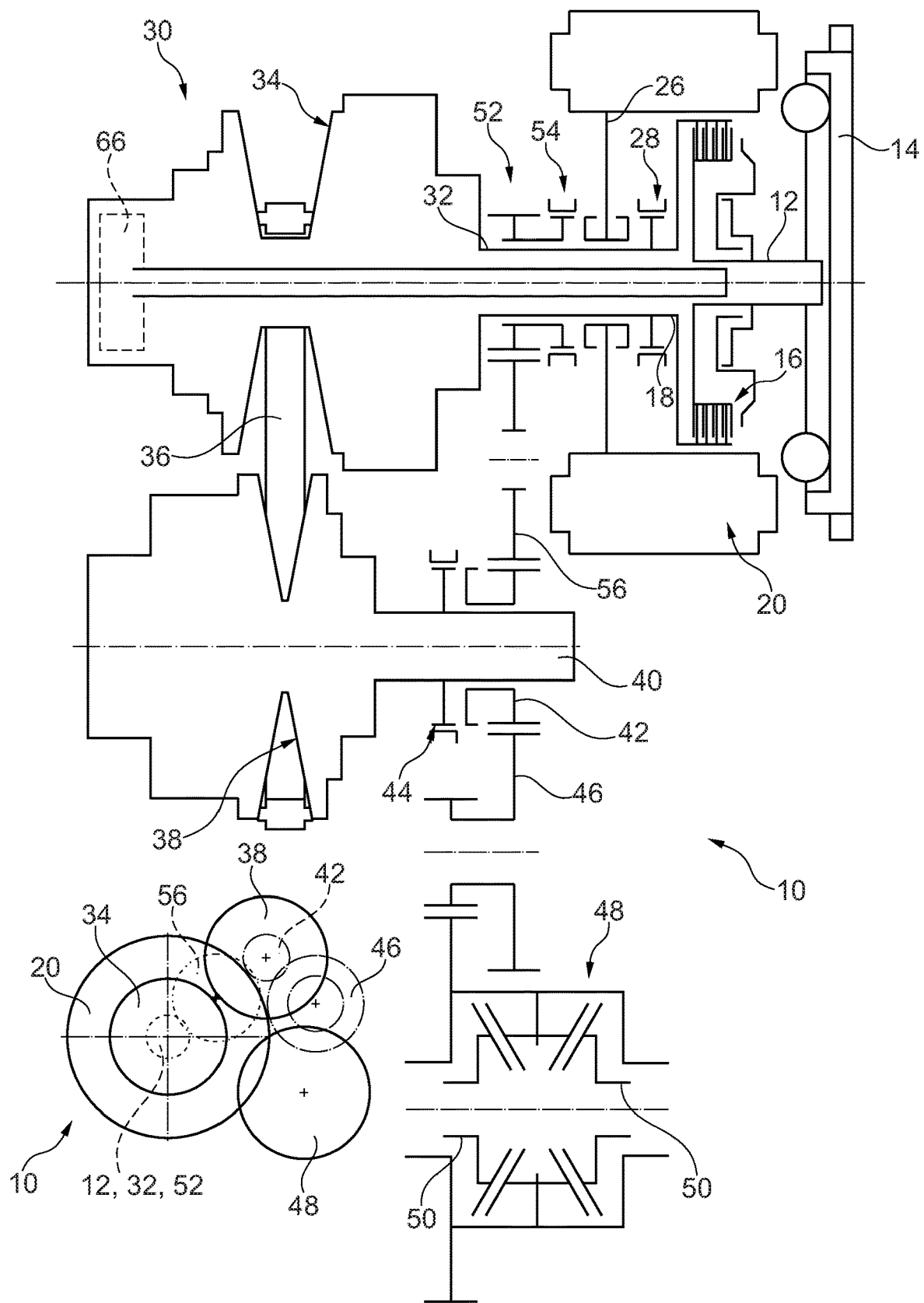
FIG. 1: shows a schematic basic illustration of a first embodiment of a drive train.
Figure 2:
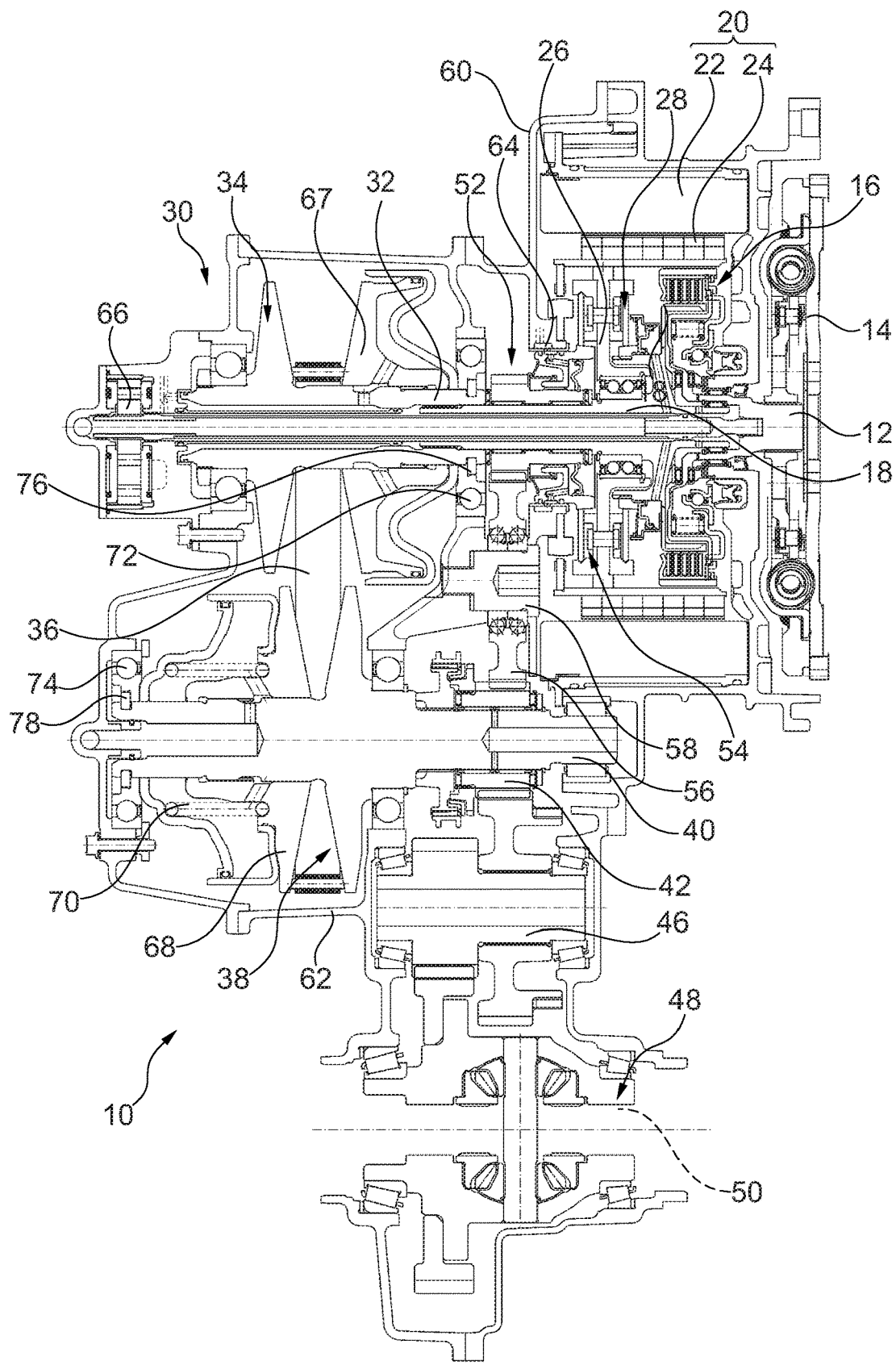
FIG. 2: shows a schematic sectional view of the drive train from FIG. 1, FIG. 3: shows a schematic basic illustration of a second embodiment of a drive train.

The drive train 10 illustrated in a developed side view and in a plan view in FIG. 1 and illustrated in more detail in FIG. 2 has a drive shaft 12, which is a hub that can be coupled to a crankshaft of an internal combustion engine via a torsional vibration damper 14 designed as a dual-mass flywheel. The drive shaft 12 can be coupled to a transmission input shaft 18 by means of a first clutch 16 designed as a multiplate clutch. The drive train 10 additionally has an electric machine 20, which has a stator 22, which has an electromagnet, and a rotor 24, which has a permanent magnet that can be made to interact with the stator 22. Connected to the rotor 24 for conjoint rotation is a transmission disk 26, which is supported and mounted on the transmission input shaft 18. With the aid of a second clutch 28 designed as a hydraulically actuable wedge clutch, the transmission disk 26 and hence the rotor 24 of the electric machine 20 can be coupled to the transmission input shaft 18 for conjoint rotation in order to introduce electric power generated in the motor mode in the electric machine 20 into the drive train 10 or to convert mechanical power taken from the drive train into electrically storable energy in the electric machine 20 operated in the generator mode.

The speed and torque of the transmission input shaft 18 can be converted in a variator 30 designed as a belt-driven CVT. For this purpose, a variator drive shaft 32 is coupled to the transmission input shaft 18. In the embodiment illustrated, the variator drive shaft 32 and the transmission input shaft 18 can be combined to form an integral common shaft. The variator drive shaft 32 drives an input-side driving cone pulley pair 34, which is coupled by a traction means 36 designed as a belt drive to an output-side driven cone pulley pair 38. Depending on the position of the driving cone pulley pair 34 and of the driven cone pulley pair 38, the transmission ratio of the variator 30 can be adjusted in a stepless manner. The driven cone pulley pair 38 drives a variator output shaft 40, which can have a modified speed and a modified torque in comparison with the transmission input shaft 18. A variator output wheel 42 is mounted on the variator output shaft 40. The variator output wheel 42 can be coupled to the variator output shaft 40 for conjoint rotation with the aid of a variator clutch 44. Particularly for reversal of the direction of rotation and/or additional ratio conversion, the variator output wheel 42 can be coupled via a connecting wheel 46 to a differential 48, which, in turn, has output shafts 50 leading to driven wheels.

With the aid of a direct drive stage 52, the power flow coming from the transmission input shaft 18 can be directed past the variator 30 to the differential 48 and the output shaft 50. For this purpose, the transmission disk 26 of the rotor 24 can be coupled to the direct drive stage 52 by means of a third clutch 54 designed as a hydraulically actuable wedge clutch. In the illustrative embodiment shown, the direct drive stage 52 is coupled to the variator output wheel 42 via an intermediate wheel 56, and therefore only minimal installation space is required for the implementation of the direct drive stage 52.

As illustrated in FIG. 2, the intermediate wheel 56 is mounted on a shaft 58 screwed to the variator 30, thus enabling the direct drive stage 52 to be preassembled with the variator 30. As a result, the first clutch 16, the second clutch 28 and the third clutch 54 can be mounted on the drive shaft 18, in particular by way of a plug-and-socket connection designed as splines, and can be connected to the variator 30 together with the electric machine 20 and a motor housing 60 covering the electric machine 20. During this process, the motor housing 60 can be fastened to a variator housing 62 covering the variator 30. In the motor housing 60 it is possible to provide an oil supply channel 64, via which hydraulic oil provided for the actuation of the third clutch 54 can be fed to the third clutch 54. To supply additional hydraulic loads in the drive train 10, e.g. for actuating the first clutch 16 and/or for actuating the second clutch 28 and/or for actuating the driving cone pulley pair 34 of the variator 30 and/or for actuating the driven cone pulley pair 38 of the variator 30, the transmission input shaft 18 and the variator drive shaft 32 can be of hollow design and/or can be provided with corresponding supply channels. The transmission input shaft 18 and/or the variator drive shaft 32 can preferably be coupled to a pump 66, which can build up the hydraulic pressure required for this purpose. In particular, the pump 66 is provided on the side of the variator 30 which faces away from the electric machine 20.

In order to change the transmission ratio of the variator 30, one of the cone pulleys of the driving cone pulley pair 34 is designed as a hydraulically axially movable adjustable input pulley 67. Depending on the axial relative position of the adjustable input pulley 67, the traction means 36 moves to a different radius. At the same time, one of the cone pulleys of the driven cone pulley pair 38 is designed as an axially movable adjustable output pulley 68, which, for its part, changes its relative position when the relative position of the adjustable input pulley 67 changes in order to ensure that the tension belt 36 remains tensioned. During this process, provision can be made for the adjustable output pulley 68 to be moved axially by hydraulic means in a manner corresponding to the adjustable input pulley 67. In addition or as an alternative, a return spring 70 acting on the adjustable output pulley 68 can be provided, against the spring force of which a hydraulic pressure must be built up at the adjustable input pulley 67.

The variator drive shaft 32 can be mounted on the variator housing 62 by means of an input bearing 72, while the variator output shaft 40 can be mounted on the variator housing 62 by means of an output bearing 74. The most distant position of the driving cone pulley pair 34 can be limited by an input-side axial retaining element 76 designed as a retaining ring, while the most distant position of the driven cone pulley pair 38 can be limited by an output-side axial retaining element 78 designed as a retaining ring. The input-side axial retaining element 76 can be inserted in a groove in the variator drive shaft 32, while the output-side axial retaining element 78 can be inserted in a groove in the variator output shaft 40. In the illustrative embodiment shown, the input-side axial retaining element 76 is provided radially on the inside in relation to the input bearing 72 and, for this purpose, is inserted into a corresponding recess in the input bearing 72. In corresponding fashion, the output-side axial retaining element 78 is provided radially on the inside in relation to the output bearing 74 and, for this purpose, is inserted into a corresponding recess in the output bearing 74. The axial installation space requirement of the variator 30 and thus of the drive train 10 is thereby reduced. Likewise, the axial installation space requirement of the drive train 10 is reduced by the fact that the first clutch 16, the second clutch 28 and the third clutch 54 are arranged at least partially, preferably completely, radially within the electric machine 20, in particular radially within the rotor 24. When viewed in the radial direction, the rotor 24 can overlap the first clutch 16, the second clutch 28 and the third clutch 54 at least partially, preferably completely.

Figure 3:
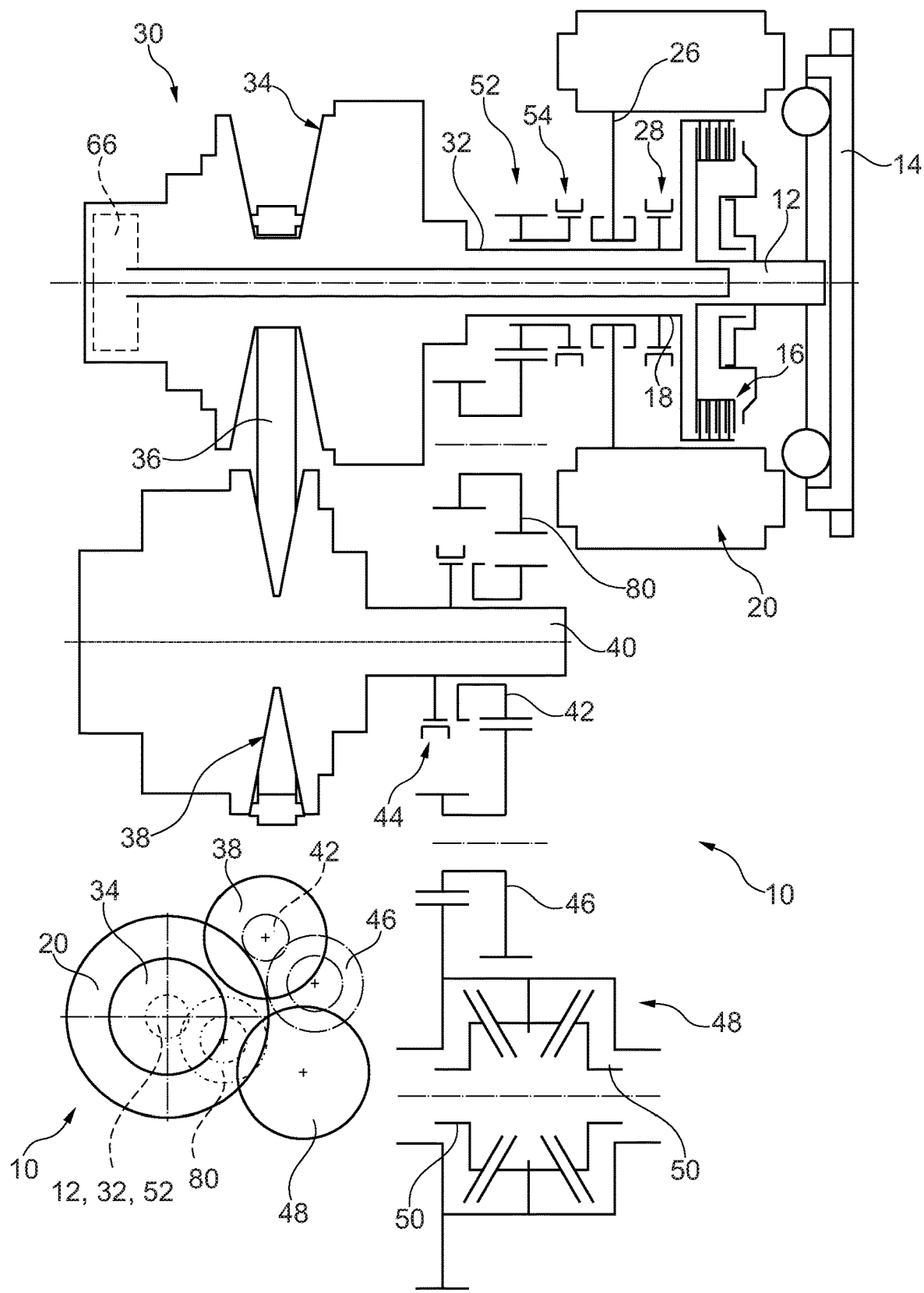

In the embodiment of the drive train 10 illustrated in FIG. 3, compared with the embodiment of the drive train 10 illustrated in FIG. 1 and FIG. 2, the intermediate wheel 56 meshing with the variator output wheel 42 is replaced by an intermediate shaft 80 meshing with the differential 48. As a result, a particularly small number of gearwheel pairs is used for a power flow directed past the variator 30.

Figure 4:
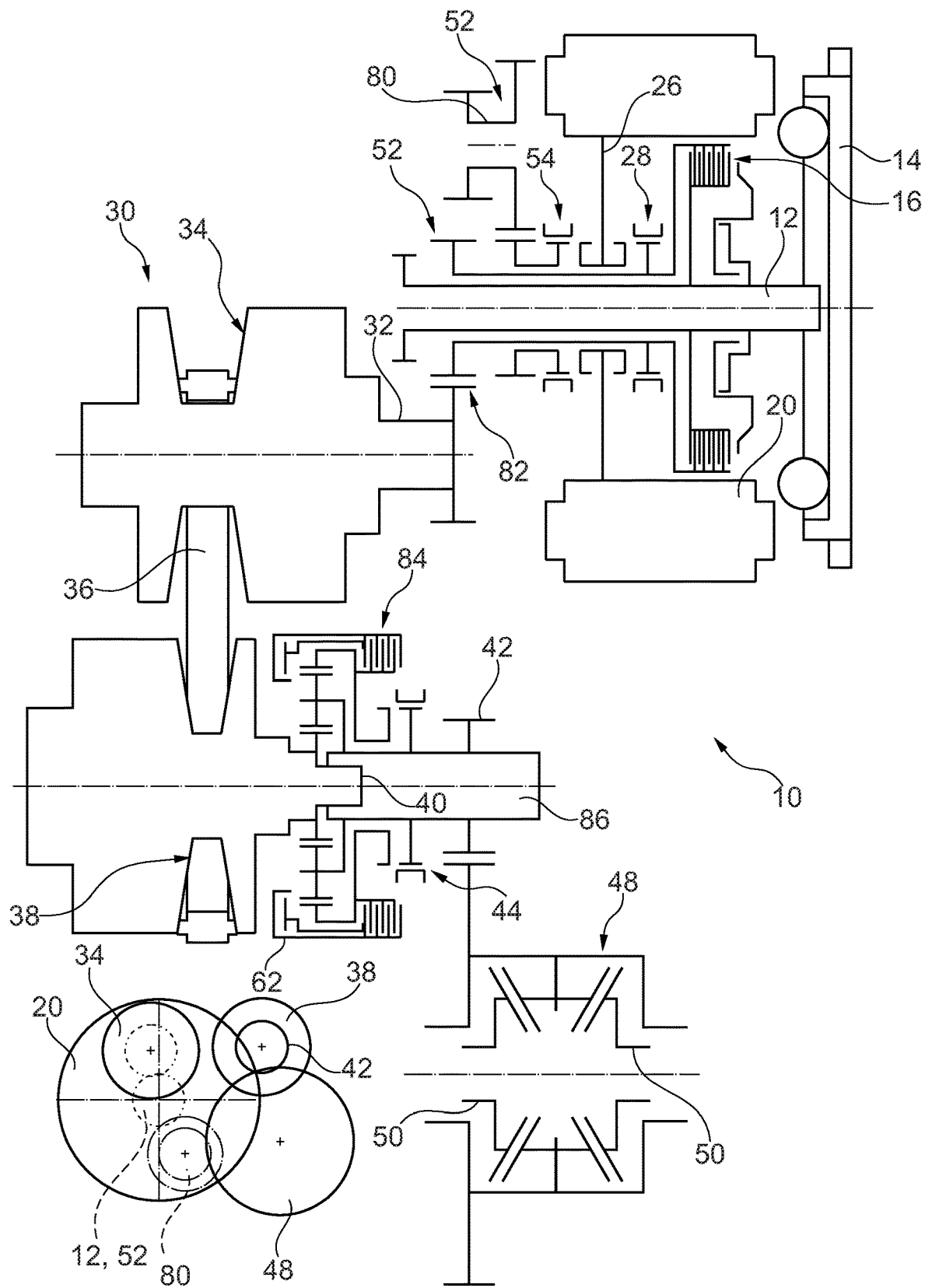
FIG. 4: shows a schematic basic illustration of a fourth embodiment of a drive train.

In the embodiment of the drive train 10 illustrated in FIG. 4, in comparison with the embodiment of the drive train 10 illustrated in FIG. 3, the variator drive shaft 32 is not arranged coaxially with the transmission input shaft 18 but is arranged laterally offset. Here, the variator drive shaft 32 is coupled to the transmission input shaft 18 by an intermediate gearwheel pair 82, thereby making it possible to eliminate the connecting wheel 46. The intermediate gearwheel pair 82 can assume the function of the connecting wheel 46 and can thereby replace the connecting wheel 46. In the illustrative embodiment shown, a range change unit 84 is furthermore provided, which couples the variator output shaft 40 to a coaxial connecting shaft 86 via a planetary transmission. The range change unit 84 can have a brake, which can optionally fix a ring gear of the planetary transmission, for example, in order to modify the transmission ratio and/or the direction of rotation between the variator output shaft 40 and the connecting shaft 86. In this case, the sun wheel of the planetary transmission can be connected to the variator output shaft 40, while the planet carrier of the planetary transmission can be connected to the connecting shaft 86 by means of the variator clutch 44. The connecting shaft 86 can be mounted to allow relative rotation on the variator output shaft 40. Moreover, the variator output wheel 42 can be connected to the connecting shaft 86 for conjoint rotation.

LIST OF REFERENCE SIGNS

- 10 drive train
- 12 drive shaft
- 14 torsional vibration damper
- 16 first clutch
- 18 transmission input shaft
- 20 electric machine
- 22 stator
- 24 rotor
- 26 transmission disk
- 28 second clutch
- 30 variator
- 32 variator drive shaft
- 34 driving cone pulley pair
- 36 traction means
- 38 driven cone pulley pair
- 40 variator output shaft
- 42 variator output wheel
- 44 variator clutch
- 46 connecting wheel
- 48 differential
- 50 output shaft
- 52 direct drive stage
- 54 third clutch
- 56 intermediate wheel
- 58 shaft
- 60 motor housing
- 62 variator housing
- 64 oil supply channel
- 66 pump
- 67 adjustable input pulley
- 68 adjustable output pulley
- 70 return spring
- 72 input bearing
- 74 output bearing
- 76 input-side axial retaining element
- 78 output-side axial retaining element
- 80 intermediate shaft
- 82 intermediate gearwheel pair
- 84 range change unit
- 86 connecting shaft

The invention claimed is:

1. A drive train for a hybrid motor vehicle, comprising:
   a drive shaft for introducing a torque produced in an internal combustion engine,
   a transmission input shaft, which can be coupled to the drive shaft by a first clutch,
   a steplessly adjustable variator coupled to the transmission input shaft for converting and transmitting the torque to an output shaft,
   an electric machine for introducing an electrically produced torque, wherein the electric machine has a rotor, which can be made to interact with a stator, and the rotor can be coupled to the transmission input shaft by a second clutch, and
   a direct drive stage, which can be coupled to the rotor of the electric machine by a third clutch, for transmitting the torque produced in the electric machine past the variator to the output shaft,
   wherein the first clutch, the second clutch and the third clutch are arranged radially on the inside in relation to the rotor and are at least partially overlapped by the rotor in an open state or a closed state, when viewed in a radial direction.

2. The drive train as claimed in claim 1, wherein the second clutch and/or the third clutch are designed as wedge clutches.

3. The drive train as claimed in claim 2, wherein the rotor has a transmission disk which projects radially inward from the rotor, for introducing the torque produced in the electric machine, wherein the transmission disk has a second transmission element for transmitting the torque in the second clutch designed as a wedge clutch, and/or has a third transmission element for transmitting the torque in the third clutch designed as a wedge clutch.

4. The drive train as claimed in claim 1, wherein a motor housing covering the electric machine is provided, wherein the motor housing has an oil supply channel for supplying the third clutches with hydraulic oil, wherein the hydraulic oil is passed via an axially movable actuating element of the third clutch.

5. The drive train as claimed in claim 1, wherein the variator has an input-side driving cone pulley pair and a driven cone pulley pair, which is coupled to the driving cone pulley pair, wherein the driving cone pulley pair has an adjustable input pulley, which can be moved axially to a limited extent with aid of an input-side axial retaining element, and the driven cone pulley pair has an adjustable output pulley, which can be moved axially to a limited extent with the aid of an output-side axial retaining element, wherein an input bearing for an input-side support of the variator at least partially overlaps the input-side axial retaining element, when viewed in a radial direction, and/or an output bearing for an output-side support of the variator at least partially overlaps the output-side axial retaining element, when viewed in the radial direction.

6. The drive train as claimed in claim 1, wherein a variator housing, which covers the variator, is provided, wherein the variator housing and/or a motor housing covering the electric machine at least partially overlaps the direct drive stage, wherein the direct drive stage is fastened to the variator housing.

7. The drive train as claimed in claim 1, wherein the variator has an input-side variator drive shaft coupled to the transmission input shaft, wherein the variator drive shaft is arranged substantially coaxially with the transmission input shaft, and the first clutch and/or the second clutch are/is coupled for conjoint rotation to the variator drive shaft on an output side, by a plug-and-socket connection, or wherein the variator drive shaft is arranged laterally offset with respect to the transmission input shaft by an intermediate gearwheel pair.

8. The drive train as claimed in claim 1, wherein the direct drive stage has an intermediate wheel, which meshes with the third clutch, wherein the intermediate wheel meshes with a variator output wheel mounted on an output-side variator output shaft, wherein the variator output wheel is coupled to the output shaft by a differential.

9. The drive train as claimed in claim 1, wherein the direct drive stage has an intermediate shaft, which meshes with the third clutch, wherein the intermediate shaft is coupled to the output shaft by a differential.

* * * * *